United States Patent [19]

Yusa

[11] Patent Number: 4,683,125
[45] Date of Patent: * Jul. 28, 1987

[54] METHOD FOR PURIFYING AN INDUSTRIAL RAW MATERIAL GAS AND A PURIFIER FOR USE IN SAID METHOD AND A METHOD OF MANUFACTURING SAID PURIFIER

[75] Inventor: Atsushi Yusa, Nagano, Japan

[73] Assignee: Olympus Optical Co., Ltd., Tokyo, Japan

[*] Notice: The portion of the term of this patent subsequent to Jan. 21, 2003 has been disclaimed.

[21] Appl. No.: 716,446

[22] Filed: Mar. 27, 1985

[30] Foreign Application Priority Data

Apr. 2, 1984 [JP] Japan .................................. 59-66453

[51] Int. Cl.⁴ ............................................. C01B 13/00
[52] U.S. Cl. .................................... 423/219; 423/220; 423/235; 423/348; 423/349
[58] Field of Search ............... 423/219, 348, 349, 220, 423/235

[56] References Cited

U.S. PATENT DOCUMENTS

| | | | |
|---|---|---|---|
| 3,033,642 | 5/1962 | Bukata et al. | 423/219 |
| 4,425,143 | 1/1984 | Nishizawa et al. | 423/219 |
| 4,528,281 | 7/1985 | Sutt, Jr. | 423/219 |
| 4,537,759 | 8/1985 | Walker et al. | 423/349 |
| 4,565,677 | 1/1986 | Yusa | 423/219 |
| 4,569,833 | 2/1986 | Gortsema et al. | 423/329 |
| 4,576,805 | 3/1986 | Chang et al. | 502/77 |

Primary Examiner—John Doll
Assistant Examiner—Jackson Leeds
Attorney, Agent, or Firm—Parkhurst & Oliff

[57] ABSTRACT

The invention relates to a purifier for purifying an industrial raw material gas, formed by depositing a hydrogenated or a fluorinated amorphous substance of an element selected from a group consisting of Si and Ge on a carrier such as a zeolite. The industrial raw material gas to be purified is brought into contact with the purifier, which is maintained at a predetermined temperature, to remove simultaneously a small amount of oxygen and water components from the industrial raw material gas.

8 Claims, 3 Drawing Figures

METHOD FOR PURIFYING AN INDUSTRIAL RAW MATERIAL GAS AND A PURIFIER FOR USE IN SAID METHOD AND A METHOD OF MANUFACTURING SAID PURIFIER

BACKGROUND OF THE INVENTION

The present invention relates to a method and apparatus for purifying a raw material gas for use in an industry and also to a purifier used in said purifying method and a method of manufacturing said purifier. More and more particularly, the invention relates to a method for removing oxygen and a water component contained in an inert gas, a highly purified gas such as $H_2$, $NH_3$ and $CO_2$ for use in the industry and a raw material gas for use in manufacturing a semiconductor device by means of said purifier.

Generally, in order to eliminate a small amount of oxygen contained in the raw material gas, use is made of a metal-carrier catalyst such as a nickel metal (Ni)-alumina carrier ($Al_2O_3$) catalyst. The catalyst mentioned above is effective as long as the raw material gas to be purified does not decrease the activity of the catalyst or the extent of deoxygenation from a hydrogen gas or an inert gas such as $N_2$, Ar or He gas. However, the catalyst is not so effective for the deoxygenation from a gas such as $NH_3$, CO, because the catalyst becomes inactive due to the above mentioned gas which functions to make it inactive. Moreover, since the catalyst must be heated to a very high temperature (i.e., over 300° C.) in the presence of a hydrogen gas, in order to activate or reactivate the catalyst, the handling and treatment of the catalyst becomes difficult. Further, since the catalyst mentioned above does not show the activity for the water component, in order to remove the water component it is necessary to arrange a separate water component absorption tank in which various zeolites are contained.

The inventor has proposed in U.S. patent application No. 622,757 filed on June 20, 1984, now U.S. Pat. No. 4,565,677, a method of purifying the raw material gas by using a purifier comprising a carrier and a hydrogenated amorphous substance of Si, Ge, P or As. In this method, the purifier functions to selectively absorb the oxygen from the raw material gas. Such characteristics occur due to the fact that an atom in the hydrogenated amorphous substance has a dangling bond with which an oxygen atom is coupled. In this method, in order to absorb the water component in the raw material gas, there is provided a separate tank containing zeolites.

The inventor has conducted various experiments and analyses and has recognized the fact that the hydrogenated amorphous substance can absorb a water component ($H_2O$) in addition to the oxygen component ($O_2$) in the same mechanism, so that it is possible to remove simultaneously a small amount of water component together with the oxygen component from the raw material gas for industrial use. It has been further confirmed experimentally that since a reaction between the dangling bond of the atom of the hydrogenated amorphous substance and oxygen atom in the raw material gas proceeds in a chemical manner, the hydrogen absorption efficiency becomes higher as the temperature increase, whilst the water component absorption efficiency of the zeolite becomes lower when the temperature is increased. Therefore, it is rather difficult to remove both the oxygen component and the water component.

SUMMARY OF THE INVENTION

The present invention has for its object to eliminate the drawbacks mentioned above and to provide a method for purifying a raw material gas, wherein an oxygen and a water component contained in the gas can be removed efficiently at the same time.

According to the invention, a method of purifying an industrial raw material gas comprises preparing a purifier comprising a carrier and a hydrogenated or a fluorinated amorphous substance of at least one element selected from a group consisting of silicon and germanium and deposited on said carrier;

heating the purifier to a given temperature; and contacting the industrial raw material gas with the heated purifier to remove an oxygen and a water component contained in the raw material gas simultaneously.

It is another object of the invention to provide an apparatus for carrying out the above mentioned method of purifying a raw material gas.

It is still another object of the invention to provide an apparatus for purifying an industrial raw material gas, wherein a purifier can also be manufactured.

According to the invention, an apparatus for purifying an industrial raw material gas comprises a reaction tank having an inlet connected to an inlet pipe and an outlet connected to an outlet pipe and containing a purifier comprising a carrier and a hydrogenated or a fluorinated amorphous substance of at least one element selected from Si and Ge deposited on the carrier; and a heater arranged around the reaction tank for heating the purifier at a given temperature, whereby a purified industrial raw material gas is supplied from the outlet pipe.

It is another object of the invention to provide a purifier for use in the above mentioned method of purifying an industrial raw material gas.

According to the invention, a purifier for purifying an industrial raw material gas comprises a carrier and a hydrogenated or a fluorinated amorphous substance of at least one element selected from a group consisting of Si and Ge and deposited on said carrier.

It is still another object of the invention to provide a method of manufacturing the above mentioned purifier for purifying an industrial raw material gas.

According to the invention, a method of manufacturing a purifier for purifying an industrial raw material gas comprises charging a carrier in a reaction tank; and introducing into the reaction tank a hydride gas or a fluoride gas of at least one element selected from Si and Ge under the existence of an excitation energy to deposit on the carrier a hydrogenated or a fluorinated amorphous substance of at least one element selected from Si and Ge.

DESCRIPTION OF THE PREFERRED EMBODIMENTS

Figure 1:
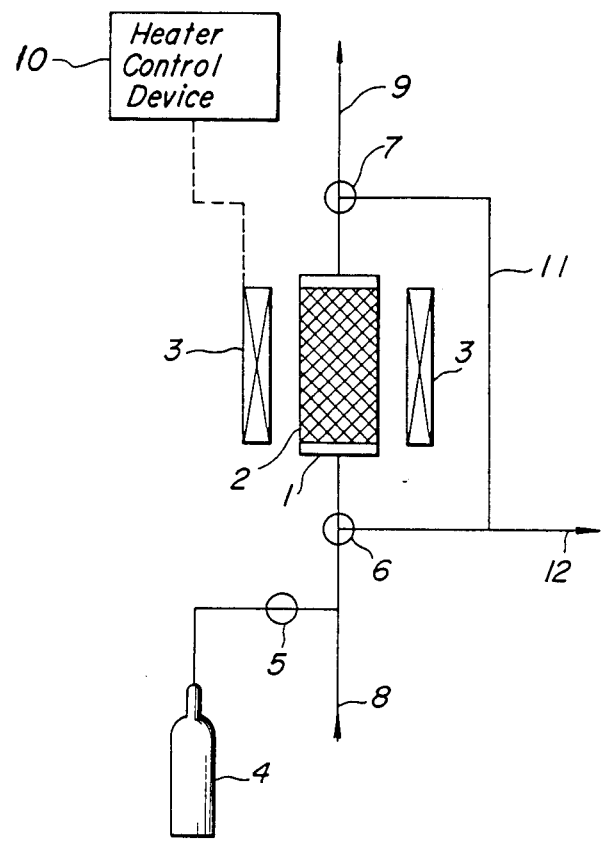
FIG. 1 is a schematic view showing one embodiment of the apparatus for purifying an industrial raw material gas according to the invention, wherein a purifier can be also manufactured.

Hereinafter, the present invention will be explained with reference to the drawings. FIG. 1 is a schematic view showing one embodiment of the apparatus for purifying an industrial raw material gas according to the invention, wherein a purifier can be also manufactured. In the embodiment shown in FIG. 1, a reaction tank 1 for removing an oxygen and a water component from the industrial raw material gas is charged with a given amount of porous carriers 2 having an inner specific surface of above 100 m²/g such as a K+ ion-exchange A, X or Y type zeolite (commercial name: Molecular Sieves). Prior to charging the carrier 2, the carrier 2 is previously activated at a high temperature treatment in an inert gas. Around the reaction tank 1 is arranged a heater 3 such as a tungsten heater or an infrared lamp heater which functions to form a hydrogenated amorphous silicon (a-Si:H) on the carrier 2 by decomposing monosilane (SiH₄) etc. Moreover, to the reaction tank 1 is connected a reservoir tank 4 containing a raw material gas for forming the amorphous substance, for example, monosilane (SiH₄) through a two-way valve 5 and a three-way valve 6. The industrial raw material gas to be purified is flowed out of a gas outlet 9 through a gas inlet 8, the three-way valve 6, the reaction tank 1 and a three-way valve 7. A heater control device 10 functions to control the temperature of the heater 3 so as to maintain the reaction tank 1 at a predetermined temperature. Moreover, a numeral 11 denotes a purge pipe and a numeral 12 represents a vent. Next, a method of purifying the industrial raw material gas and a method of manufacturing the purifier such as a hydrogenated amorphous silicon-carrier (a-Si:H) will be explained.

At first, the reaction tank 1 is heated by the heater 3 at a temperature from 300° C. to 450° C., i.e. a temperature higher than a thermal decomposition temperature of the monosilane (SiH₄) contained in the reservoir tank 4. Then the monosilane is flowed into the reaction tank 1 through the two-way valve 5 and the three-way valve 6. The monosilane (SiH₄) flowed into the reaction tank 1 is decomposed by the heat into an amorphous Si and an H₂, and the decomposed amorphous Si is deposited on the carrier 2. At the same time, the decomposed H₂ and the not-decomposed monosilane (SiH₄) are discharged from the vent 12 through the three-way valve 7 and the purge pipe 11. After the carrier 2 is sufficiently covered with the hydrogenated amorphous Si (a-Si:H), the two-way valve 5 is closed to stop a supply of the monosilane (SiH₄) from the reservoir tank 4. Then, the temperature of the reaction tank 1 is lowered to a predetermined temperature such as 300° to 350° C. by means of the heater control device 10. Since this predetermined temperature is related to an absorbing efficiency and a life of the catalyst, it is determined by taking account of various conditions such as amounts of O₂ and H₂O contained in the industrial raw material gas to be purified, and a flow rate and a processing amount of the industrial raw material gas to be purified. The industrial raw material gas to be purified is supplied from the gas inlet 8 and is flowed out of the gas outlet 9 through the three-way valve 6, the reaction tank 1 and the three-way valve 7.

When a purging operation is to be effected prior to a supply of the purified gas to, for example, a semiconductor manufacturing device (not shown), the three-way valve 7 is opened to the purge pipe 11 so as to discharge the gas for use in the purging operation from the vent 12. After that, the three-way valve 7 is returned to the gas outlet 9 side and then the industrial raw material gas to be purified is introduced into the apparatus from the gas inlet 8.

Figure 2:
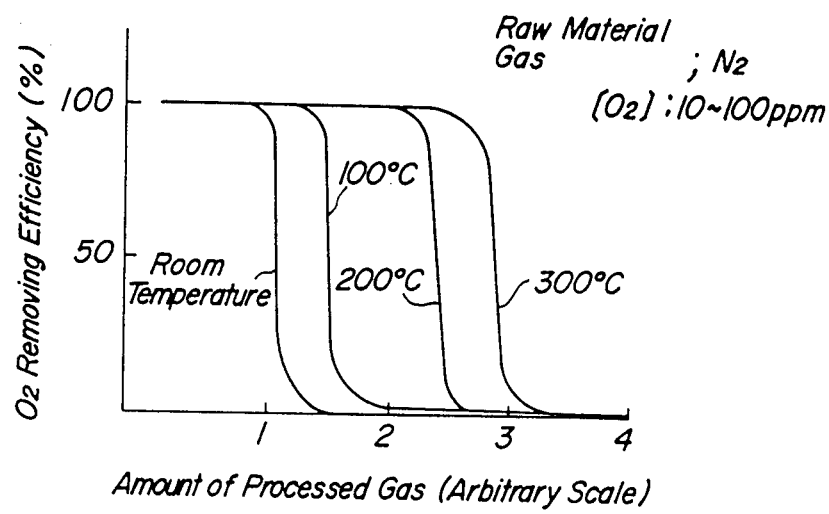
FIG. 2 is a graph illustrating a relation between a removed O₂ percentage and an amount of purified industrial raw material gas.

FIG. 2 is a graph showing an O₂ removing efficiency of the apparatus according to the invention at various reaction temperatures. In FIG. 2, a vertical axis shows a removed O₂ percentage and a horizontal axis illustrates an amount or purified industrial raw material gas. As to the industrial raw material gas, use is made of an N₂ gas in which O₂ component is included from 10 to 100 ppm. Here, the O₂ removing efficiency is determined by the following equation.

$$(O_2 \text{ removing efficiency}) = \frac{\left(\begin{array}{c} O_2 \text{ concentration in} \\ \text{raw material gas} \end{array}\right) - \left(\begin{array}{c} O_2 \text{ concentration in purified} \\ \text{raw material gas} \end{array}\right)}{O_2 \text{ concentration in raw material gas}} \times 100$$

For example, O₂ removing efficiency=100% means that O₂ concentration in the purified gas is decreased below the lowest detectable value of 0.01 ppm. As shown in FIG. 2, the purifier in the reaction tank 1 shows a sufficient activity at a room temperature, and the activity thereof becomes larger in accordance with a rise in temperature. The most suitable temperature for the reaction in the reaction tank 1 varies in accordance with a kind of gas to be purified, and in case of using the inert gas such as N₂ etc., the most suitable value lies in a high temperature region. However, since NH₃ gas, CO gas, etc. cause a weak reaction to the hydrogenated amorphous Si, they show a decrease in activity if the temperature becomes over 300° C., and thus their most suitable temperature lies in a lower temperature range as compared with N₂ gas.

Figure 3:
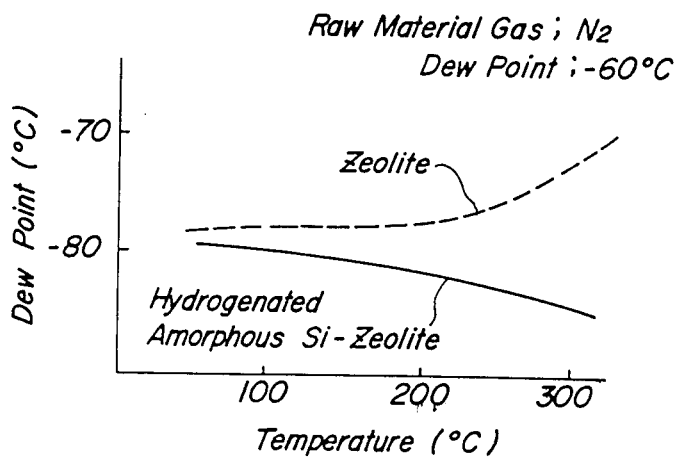
FIG. 3 is a graph depicting a relation between the temperature of a reaction tank and a dew point of the industrial raw material gas.

The water component removing efficiency of the apparatus according to the invention will now be explained. FIG. 3 is a graph showing a relation between the temperature of reaction tank 1 and a dew point of the purified gas (industrial raw material gas to be purified; N₂ of dew point −60° C.). In FIG. 3, dotted line shows the dew point in case of using an A-type zeolite as the water component absorbing substance, and the solid line shows that for the hydrogenated amorphous Si-zeolite (a-Si:H) comprising the A-type zeolite carrier and the hydrogenated amorphous Si deposited on the zeolite carrier. Comparing the solid line with the dotted line, there is not a large difference therebetween in their water component removing efficiency when the temperature in the reaction tank 1 is lower than 200° C. However, when the temperature becomes above 200° C., the dew point of the gas purified by the A-type zeolite carrier rises as shown by the dotted line and thus the water component removing efficiency thereof becomes worse. Contrary to this, the dew point of the gas purified by the amorphous Si-zeolite purifier according to the invention becomes lower than that at room temperature as shown by the solid line and thus the water component removing efficiency becomes better, when the temperature becomes higher than 200° C. As clearly seen from the above, in the purifier according to the invention i.e. hydrogenated amorphous Si-carrier, the removal of the water component from the industrial raw material gas is effected not only by the zeolite, but also by a superimposed effects of the zeolite and hydrogenated amorphous Si. In the manner explained above, according to the invention, it is possible to remove simultaneously the oxygen and water component from the raw material gas at a very high efficiency.

In the embodiment mentioned above, use is made of $SiH_4$ as the raw material gas for manufacturing the hydrogenated amorphous, substance but use may be made of $Si_2H_6$ or $GeH_4$ instead of $SiH_4$. Further, use may be made of $SiF_4$ as the raw material gas for manufacturing a fluorinated amorphous Si-carrier. According to the invention, it is possible to remove a small amount of $O_2$ and water components contained in industrial raw material gas by means of the purifier, i.e. the hydrogenated amorphous-carrier or a fluorinated amorphous-carrier of a material selected from Si and Ge. Moreover, in the embodiment mentioned above, use is made of the zeolite as the carrier, but the present invention is not limited to this. For example, use may be made of a porous carrier such as Carbon Molecular Sieves having a large specific inner surface and a pore diameter larger than that of the raw material gas for manufacturing the amorphous substance such as monosilane, in which the hydrogenated or fluoride amorphous is formed in the pore. Further, the purifier is not limited to the hydrogenated amorphous-carrier and the fluorinated amorphous-carrier, but it is possible to use a combination thereof such as a-Si:H:F-carrier, a-Si-Ge:H-carrier or a-Si-Ge:H:F. Furthermore, the heater 3 may be formed by any other device than a tungsten heater or an infrared lamp heater. If use is made of a glass or a quartz as the reaction tank 1, it is possible to irradiate the carrier directly with infrared radiation emitted from the infrared lamp heater. The infrared lamp heater can uniformly heat the reaction tank as compared with the tungsten heater, and thus it is possible to manufacture the uniform hydrogenated amorphous-carrier. Moreover, in the embodiment mentioned above, although the hydrogenated amorphous Si (a-Si:H) is manufactured by the heat decomposition of the monosilane gas, the present invention is not limited to the heat decomposition method. For example, use may be made of a radiation decomposition excited by a visible light laser or a halogen lamp such as Hg lamp, Xe lamp or a decomposition excited by a plasma.

As mentioned above, according to the invention, since use is made of the purifier such as the hydrogenated or the fluoride amorphous-carrier, the following advantages can be obtained as compared with the known metal-carrier catalyst.

(1) Oxygen and water component removing efficiencies are not affected by a kind of gas to be purified and become higher than those of the metal-carrier catalyst.
(2) Since oxygen and water component can be removed at the same time from the industrial raw material gas to be purified, the apparatus for purifying the raw material gas can be made much compact in size and inexpensive in cost.
(3) Water component removing efficiency can be made higher than that of the zeolite at the room temperature, and at the high temperature it is further improved.

What is claimed is:

1. A method of purifying an industrial raw material gas selected from the group consisting of hydrogen, nitrogen, argon, carbon dioxide and ammonia, said raw material gas containing oxygen and water components, comprising the steps of:
   (a) preparing a purifier by:
      (i) charging a reaction vessel with a carrier selected from the group consisting of a porous $K^+$ ion-exchange A, X or Y zeolite and porous carbon molecular sieves;
      (ii) heating said carrier to a temperature greater than a thermal decomposition temperature of at least one gas selected from the group consisting of hydride and fluoride gases of at least one element selected from the group consisting of Si and Ge; and
      (iii) introducing said at least one gas of said at least one element into the reaction vessel, thereby depositing a layer on said carrier of at least one substance selected from the group consisting of a hydrogenated amorphous substance and a fluorinated amorphous substance of said at least one element;
   (b) heating said purifier;
   (c) contacting the industrial raw material gas with the heated purifier to remove simultaneously said oxygen and water components from the industrial raw material gas.
2. A method according to claim 1, wherein said substance is hydrogenated amorphous silicon.
3. A method according to claim 1, wherein said substance is fluorinated amorphous silicon.
4. A purifier for purifying an industrial raw material gas selected from the group consisting of hydrogen, nitrogen, argon, carbon dioxide and ammonia, said raw material gas containing oxygen and water components, comprising a carrier selected from the group consisting of a porous $K^+$ ion-exchange A, X or Y zeolite and porous carbon molecular sieves and at least one substance selected from the group consisting of a hydrogenated amorphous substance and a fluorinated amorphous substance of at least one element selected from the group consisting of Si and Ge, deposited on the carrier as a layer.
5. A method of manufacturing a purifier for purifying an industrial raw material gas selected from the group consisting of hydrogen, nitrogen, argon, carbon dioxide and ammonia, said raw material gas containing oxygen and water components, comprising:
   charging a reaction vessel with a carrier selected from the group consisting of a porous $K^+$ ion-exchange A, X or Y zeolite and porous carbon molecular sieves;
   heating said carrier to a temperature greater than a thermal decomposition temperature of at least one gas selected from the group consisting of hydride and fluoride gases of at least one element selected from the group consisting of Si and Ge; and
   introducing said at least one gas of said at least one element into the reaction vessel, thereby depositing a layer on said carrier of at least one substance selected from the group consisting of a hydrogenated amorphous substance and a fluorinated amorphous substance of said at least one element.
6. A metod according to claim 5, wherein said carrier is heated to a temperature of about 300° to 350° C.
7. A method according to claim 5, wherein said at least one gas is decomposed by an excitation radiation.
8. A method according to claim 5, wherein said at least one gas is decomposed by an excitation plasma.

* * * * *